Feb. 12, 1929. 1,701,582
G. MENGDEN
ROAD OR COURSE INDICATOR FOR MOTOR VEHICLES,
VESSELS, AIRCRAFT, OR THE LIKE
Filed June 19, 1925  4 Sheets-Sheet 2
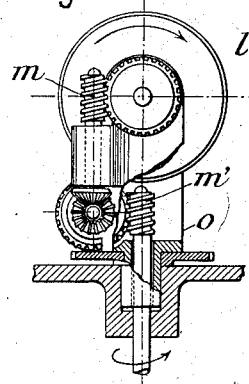
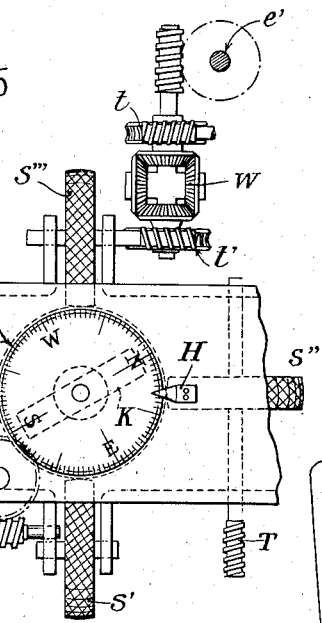
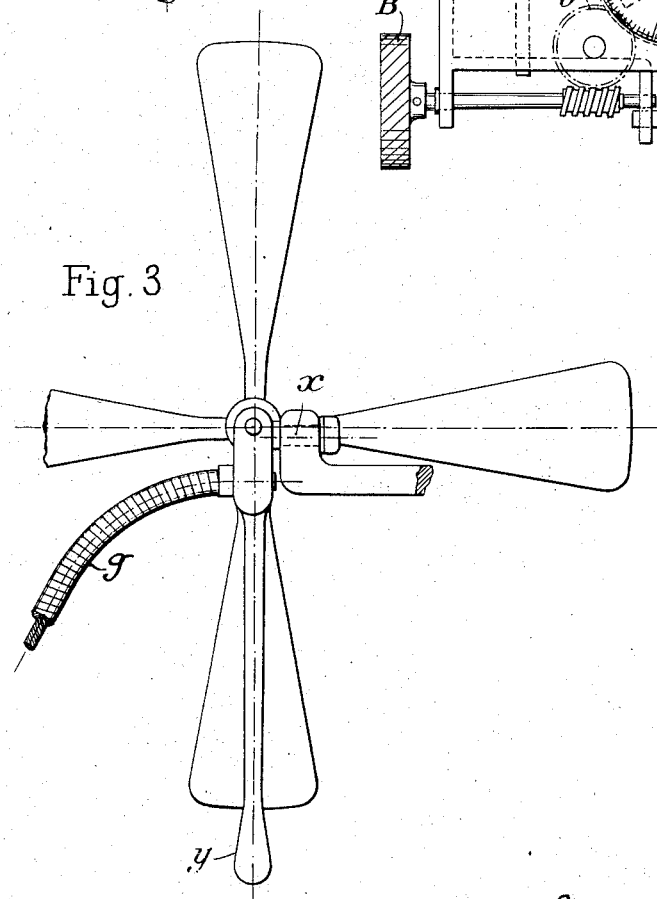
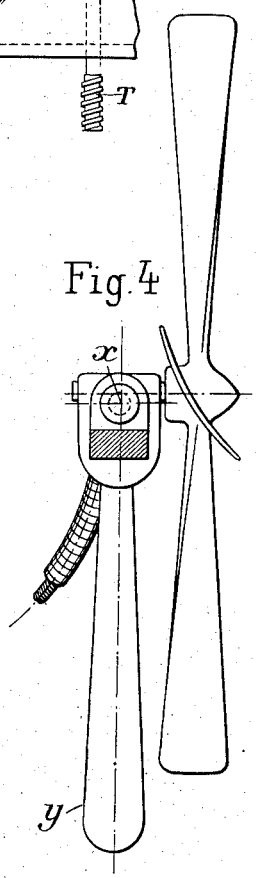

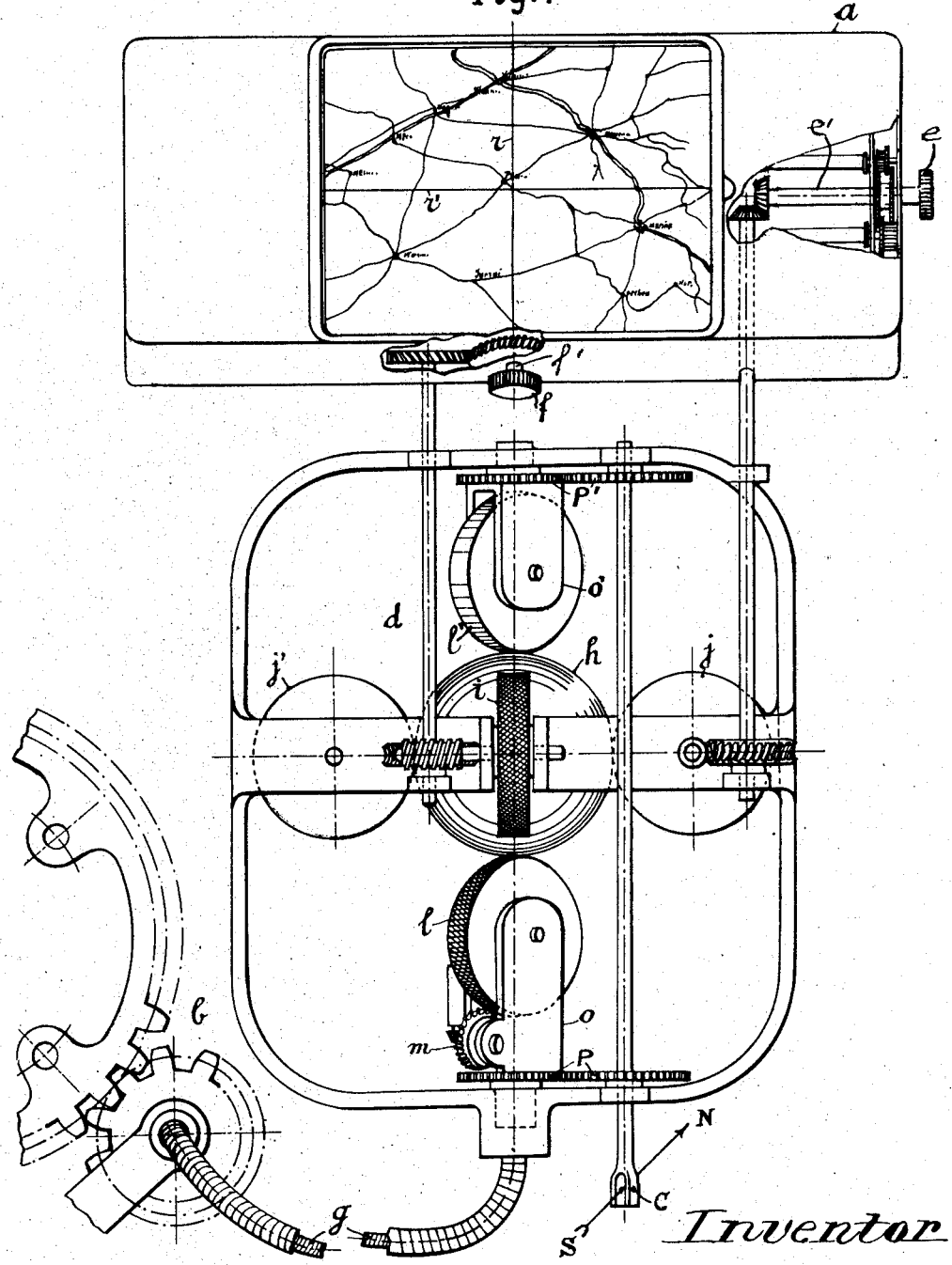

Feb. 12, 1929. 1,701,582

G. MENGDEN

ROAD OR COURSE INDICATOR FOR MOTOR VEHICLES, VESSELS, AIRCRAFT, OR THE LIKE

Filed June 19, 1925 4 Sheets-Sheet 3

Feb. 12, 1929. 1,701,582
G. MENGDEN
ROAD OR COURSE INDICATOR FOR MOTOR VEHICLES,
VESSELS, AIRCRAFT, OR THE LIKE
Filed June 19, 1925   4 Sheets-Sheet 4

Patented Feb. 12, 1929.

1,701,582

UNITED STATES PATENT OFFICE.

GEORGES MENGDEN, OF MELZ-SUR-SEINE, FRANCE.

ROAD OR COURSE INDICATOR FOR MOTOR VEHICLES, VESSELS, AIRCRAFT, OR THE LIKE.

Application filed June 19, 1925, Serial No. 38,348, and in France July 23, 1924.

My invention has for its object an apparatus for automatically indicating or recording on a map or the like the movements of a motor vehicle, a ship, an aircraft or other mobile unit, wherein a suitable map is displaced in an automatic manner in a direction corresponding to the direction of travel of the vehicle, but in the contrary sense so that the point occupied by the vehicle will be constantly shown adjacent the point of intersection of two marking lines, drawn for instance upon a transparent facing sheet.

The said apparatus comprises in principle two rollers with orthogonal axes which are set in rotation by friction on a sphere which is rotatable about its centre. Said rollers respectively control the displacements of the map in two perpendicular directions; the said sphere is rotated by a third roller actuated by an element whose number of revolutions is proportional to the speed of the vehicle, and the support of said roller can be pivoted about an axis passing through the centre of the sphere and subjected to the action of a gyroscopic compass or like device having a sufficient directive force.

In this manner, the said sphere is subjected to angular movements exactly corresponding to the actual travel of the vehicle (or the like) and such displacements are imparted to the map.

The element which imparts its rotation to the actuating roller may be for instance one of the wheels in the case of a motor car, a log in the case of a vessel, a small air screw or air log if the apparatus is an aeroplane, airship or the like.

In the latter case it will be necessary to make corrections for the action of the wind, and for this purpose I employ a device analogous to the device used on the main apparatus comprising a driving roller actuated by a motor whose speed is regulated so as to be proportional to the velocity of the wind, and which is oriented in the direction of the latter, this velocity and direction being estimated or found by the usual methods now in common use. The driven rollers impart their motion respectively to shafts connected by differentials with the controls of the map.

The appended drawings show by way of example an embodiment of the invention (schematic representation).

Fig. 1 shows the whole arrangement of the apparatus as mounted on a motor vehicle.

Fig. 2 is a detail of the driving roller.

Figs. 3 and 4 are respectively front and side views of a small air screw or anemometer vane used to transmit the speed of an aeroplane.

Fig. 5 is a plan view of a part of the correcting device.

Figure 6:
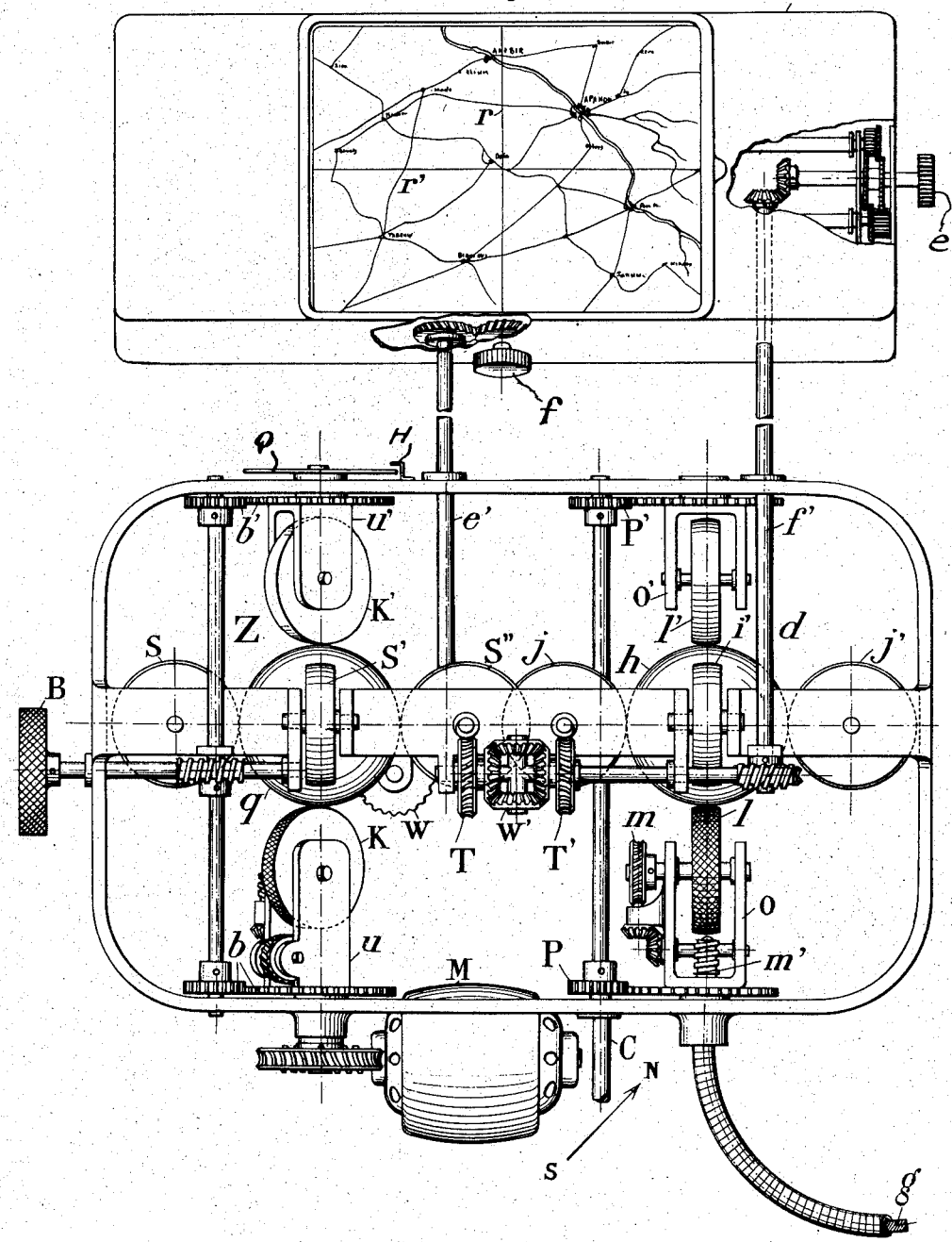
Fig. 6 is a diagrammatic front view of the device combined with the wind or drift corrector.

In Fig. 1, the apparatus comprises the following essential parts:

(1) a metallic case $a$ containing the map.

(2) a power transmission device $d$ which is connected with a wheel of the vehicle after the manner of a mile-counter, and is capable of displacing the said map at a speed proportional to the speed of the vehicle and corresponding to the scale of the said map;

The shaft $c$ is coupled to a compass repeater, not shown, or to an equivalent device having the necessary power to orient the driving rollers $l$ and $l'$.

The casing $a$ forms the subject matter of the U. S. Patent No. 1,596,936, dated Aug. 24, 1926, entitled "Cases or holders for maps and plans". Said casing or map holder is characterized in that, while it is of a small size it will contain a large map which is cut up into bands or sections. Due to a winding arrangement and to a special mechanism, the map is movable below the transparent facing of the map holder in a continuous manner in the direction of the meridians by rotating a milled head $e$, and in the direction of the parallels by rotating a second button $f$; these two movements may be effected simultaneously but are however distinct from each other.

The map holder is secured to a case, not shown, containing the other parts of the apparatus, and is mounted on the dashboard of the vehicle. The motion of the vehicle is imparted to the map by means of a pinion $b$ controlled by one of the vehicle wheels, by means of a flexible transmission element $g$, and of the mechanism $d$ which serves to resolve the movement of the vehicle into its rectangular components which are next composed in a resultant on the map by imparting rotary movements to the shafts $e'$ and $f'$ and displacing by the same the said map according to two perpendicular directions relatively to a fixed point on the transparent facing sheet.

This mechanism comprises a ball $h$ placed between three pairs of friction rollers $i$, $i^1$, $j$, $j^1$, $l$, $l^1$. In each pair, the two rollers have their axes parallel and are situated at diametrical opposite points on the sphere $h$. The axes of the rollers $i$ and $i^1$ are disposed at right angles relatively to the axes of the rollers $j$ and $j^1$ in a diametrical plane of the sphere.

The rollers $j$ and $i$ are connected by worm gearing, for example, with the shafts of the knobs $e$ and $f$ controlling the motion of the map. The rollers $l$ and $l^1$ forming the third pair are held in the forks $o$ and $o^1$ which are pivotally mounted on axes passing through the centre of the sphere and perpendicular to the aforesaid diametrical plane of the sphere; the axes of the rollers $l$ $l^1$ are parallel to this same diametral plane.

The movement of rotation of one of the vehicle wheels is imparted to the roller $l$ (Fig. 2) by the worm gearing $m$ which is controlled by the flexible element $g$.

The pivoted forks $o$ and $o^1$ carrying the rollers $l$ and $l^1$ are connected by the gearing $p$ and $p^1$ with the shaft $c$ of the gyroscopic compass or the like, which latter tends to preserve its initial orientation. The gearing is so disposed that the axes of rotation of the pivoting rollers $l$ and $l^1$ shall be in all cases in the parallel position and shall be parallel to the axis of the actuated roller $j$ which displaces the map in the direction of the meridians, when the path of the vehicle coincides with a meridian. The rotation of the actuated rollers $i$ and $j$ is imparted to the shafts of the knobs controlling the map with a suitable speed reduction by means of worm gearing.

The rollers $l$ $i$ and $j$ transmitting the motion have the same diameter, and are faced at the periphery with a substance whereby slipping will be obviated, for example a layer of india rubber or a ball made of india rubber or similar substance may be used in connection with nonelastic rollers. The other rollers $l^1$ $i^1$ and $j^1$ may be loose and serve to support the sphere or may be also used for transmitting motion in assistance to the three first rollers.

When the vehicle is travelling, the driving roller $l$ rotates the sphere which imparts the motion to the receiving rollers $i$ and $j$ connected with the map, by displacing the latter in a direction corresponding to the direction of travel of the vehicle, but in the contrary sense.

When the direction of the vehicle changes by a given angle, the shaft $c$ of the gyroscopic compass remains in the same orientation as before, and it causes the forks $o$ and $o^1$ of the rollers $l$ and $l^1$ to pivot, relatively to the remainder of the mechanism, through a like angle; this is equal to the angle between the line corresponding to the new direction of the vehicle and to the line representing the original direction.

The axis of rotation of the ball $h$ changes its direction according to the position of the rollers $l$ and $l^1$, and the movement of rotation of said rollers, decomposed into two components, is imparted to the map by the two rollers $i$ and $j$ which are connected with the said knobs, so that the map will be moved according to the direction of the resultant corresponding to the new direction of the vehicle. In this manner the point on the map which represents the actual position of the vehicle on the road (or course) is brought once for all to the intersection of two stationary indicating lines $r$ and $r^1$ (Fig. 1) formed on the transparent sheet $a$, and this intersection will show upon the map the successive positions of the vehicle during the travel.

When the route or course of the vehicle is preliminarily traced upon the map, a single glance will show the direction to be followed at each instant during the travel. The same apparatus will also serve to trace the route already covered, by means of a pencil, or to draw up a plan and to lay it out upon a sheet of paper.

The apparatus may be mounted on shipboard, and herein the vehicle wheel is replaced by a special log. To employ the apparatus upon aeroplanes or airships, the vehicle wheel is replaced by a small air screw or log (Figs. 3 and 4) with adjustable blades which is placed in the current of air due to the travel and serves to rotate the driving roller $l$ through the flexible transmission $g$ and a set of worm and bevel gearing $m$ and $m'$ (Fig. 6); the speed of said roller is proportional to the speed of the aeroplane relative to the atmosphere. Both of the rollers $l$ and $l'$ may be oriented conjointly by a compass repeater (not shown) coupled to the shaft $c$. The driven rollers $j$ and $i$ are disposed so as to receive from the sphere the rectangular components of the proper speed of the aircraft and are respectively connected with the two spindles $e'$ and $f'$ controlling the map displacements. In order that the map shall move at a speed corresponding to the actual speed of the aircraft relatively to the ground, the directional velocity of the wind must be composed with the relative or proper directional velocity of the aircraft.

Figure 7:
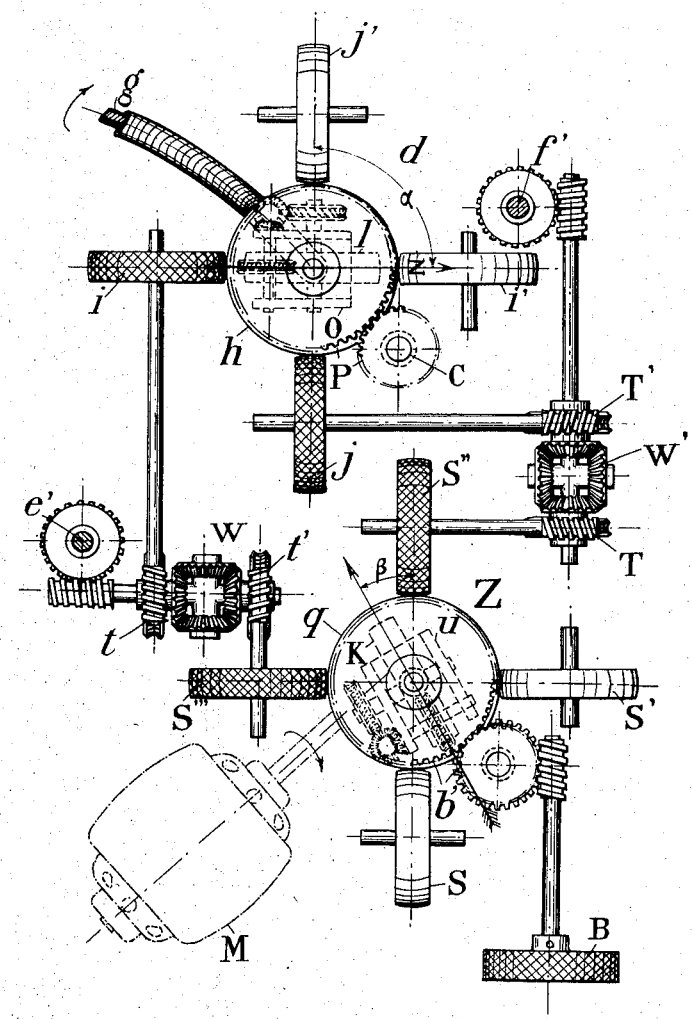
Fig. 7 shows the same device in a diagrammatic plan view.

This drift correction is automatically effected by a second velocity resolving device consisting of a transmitting mechanism similar to the aforesaid mechanism $d$, and adapted to impart an additional movement to the map. Figs. 6 and 7 show the same mechanisms arranged in a slightly different manner, the same parts being denoted by the same reference letters as the above. The following description also refers to these two forms of construction.

The corrector $z$ comprises a ball $q$ surrounded by a set of friction rollers $s\ s'\ s''\ s'''\ k$ and $k'$ (in Figs. 5 and 7, $k'$ being under the sphere $q$ cannot be seen), disposed exactly as above set forth, with the sole difference that the driving roller $k$ is given a uniform rotation—from any power source—which can be regulated according to the indicated velocity of the wind. The forks $u$ and $u'$ holding the driving rollers are connected together by gearing $b'$, $b''$ in order to pivot conjointly, the axes of their rollers being always parallel; said forks may be oriented according to the direction of the wind by means of a knurled knob B (Figs. 5, 6, 7) and with the aid of a compass card Q fixed to the pivoting fork $u'$ and of an index H and then fixed in this position. The correcting device $z$ is so disposed that the velocity corresponding to that of the wind is resolved in two components which are parallel to the components of the proper speed of the aircraft obtained by means of the device $d$ previously described.

The addition or subtraction of the said parallel components is effected by means of the worm gearing transmission devices $t$ and $t^1$ T and $T^1$ and of two sets of differential gearing $w$ and $w^1$ respectively connected with the shafts $e'$ and $f$ controlling the map displacements. This latter "map" is moved in a direction corresponding to the actual displacement of the aircraft, but in the contrary sense.

The velocity and direction of the wind being periodically observed for instance by means of a "navigraph", or simply estimated, is then sufficient to suitably disposed the pivoting rollers $k$ of the corrector $z$ Figs. 6 and 7 and to regulate their speed of rotation; this drive may be effected by a small electric motor M, wind motor, clockwork or the like.

After having brought the point on the map which represents the actual position of the aircraft to the intersection of the two stationary indicating lines $r$ and $r'$ (Fig. 6) on the transparent sheet, this intersection will show upon the map the successive positions of the aircraft during the travel.

The same device may also serve to automatically mark the route already covered by means of a tracing pen placed at the intersection of the lines $r$ and $r'$.

The correction for upward and downward travel is automatically obtained by the air screw or air log (Figs. 3 and 4) which imparts the motion to the driving roller 1 of the main velocity resolving gear $d$. The bearing of the air screw is held in a pivot $x$ and is provided with a counterweight $y$ tending to maintain the screw axis in the horizontal position, and this will render the speed of its rotation directly proportional to the horizontal component of the relative speed of travel of the aircraft.

In this manner the map will always be moved, at a speed proportional to the speed of the aeroplane relatively to the ground, and according to the corresponding direction, so that the pilot without regard to the evolutions of the aircraft can observe his exact position by a single glance at the map, and without any calculations or manipulations.

The corrections for the errors due to a defective indication of the wind, to the slipping of the wind screw or vane, and the like, can be made by hand operating the knobs controlling the map, and by disengaging the map for an instant from the automatic control. This correction may be made as soon as an opportunity occurs to identify the region of flight by direct observation of the ground.

Obviously, I may also dispose the map case and the ball controlling mechanism upon a support mounted upon a vertical axis passing through the centre of the case and the centre of the driving roller, the latter rotating in a plane fixed with regard to the vehicle. Since the case and the map are connected with the compass repeater they will always have the proper orientation.

The advantage of this arrangement is obvious and chiefly where the case is accessible on all sides, the observation of the map indications being thus facilitated. At all events, it is to be noted that the transmission ratio of the control mechanism should be in accordance with the scale of the map in use.

Corrections for change in latitude may be made automatically by a progressive change in the ratio of transmission between the control of the map in the direction of the parallels and the corresponding driven roller; this variation can be effected by means of the second driven roller.

Having thus described my apparatus, what I claim as new therein, and my own invention, is:

1. In an automatic route indicator for motor vehicles, vessels or aeroplanes, the combination of a spherical element which serves to decompose the actual displacement of the vehicle into two components, three pairs of friction rollers, the rollers of each pair having their axes parallel and being adapted to bear upon the said spherical element at diametrically opposite points, the rollers of one of the three pairs being adapted to be suitably controlled and rotating at a speed proportional to the speed of travel of the vehicle, said rollers also pivoting on an axis passing through the centre of the said sphere and the plane of the said rollers, means for pivoting simultaneously the said rollers according to the direction of travel of the vehicle, the rollers of the other two pairs being rotatable in two respective fixed planes which are perpendicular to each other, a map which is movable in two main directions perpendicular to each other, and means for the transmission of motion with a suitable reduction adapted to connect the said map with the two pairs of rollers rotating in the two fixed planes.

2. In an automatic route indicator for aircraft, the combination of a map which is movable according to the resultant of four components, corresponding to two independent speeds, a main apparatus for the decomposition of the proper speed of the aircraft into two components, a correcting apparatus for the decomposition of the displacement of the aircraft due to the wind into two components which are parallel to the two components of the proper speed of the vehicle, a motor adapted to control the said correcting apparatus, the main apparatus as well as the correcting apparatus comprising in combination a spherical element, three pairs of rollers, the rollers of each pair having their axes parallel and being adapted to bear upon the said spherical element at diametrically opposite points, the rollers of one of the three pairs of the main apparatus being adapted to be suitably controlled and rotating at a speed proportional to the proper speed of the aircraft, said rollers also pivoting on an axis passing through the centre of the said spherical element and the plane of the said rollers, and means for pivoting the said rollers according to the direction of travel of the vehicle, the rollers of the two other pairs being rotatable in two respective fixed planes which are perpendicular to each other, the rollers of one of the three pairs of the correcting apparatus being driven by said motor at a speed which may be regulated so as to correspond to the speed of the wind, said rollers also pivoting about an axis passing through the centre of the said spherical element and the plane of the said rollers, and means for orienting the said rollers according to the direction of the wind, the rollers of the other two pairs being rotatable in two respective fixed planes which are perpendicular to each other, means for controlling the displacements of the map in one direction, these means comprising a differential connected, on the one hand, with one of the two last mentioned rollers of the main apparatus and, on the other hand, with one of the two last mentioned rollers of the correcting apparatus, and means for controlling the displacements of the map according to a direction which is at right angle with the preceding one, these latter means comprising also a differential connected, on the one hand, with the second of the two last mentioned rollers of the main apparatus and, on the other hand, with the second of the two last mentioned rollers of the correcting apparatus, for the purpose specified.

3. In an automatic route indicator for vehicles, the combinations of a map which is movable according to the resultant of four components, corresponding to two independent speeds, a main apparatus for the decomposition of the proper speed of the aircraft into two components, a correcting apparatus for the decomposition of the displacement of the aircraft due to the wind into two components which are parallel to the two components of the proper speed of the vehicle, a motor adapted to control the said correcting apparatus, the main apparatus as well as the correcting apparatus comprising in combination a spherical element, three pairs of rollers, the rollers of each pair having their axes parallel and being adapted to bear upon the said spherical element at diametrically opposite points, the rollers of one of the three pairs of the main apparatus being adapted to be suitably controlled and rotating at a speed proportional to the travel of the aircraft, said rollers also pivoting on an axis passing through the centre of the said spherical element and the plane of the said rollers, and means for pivoting the said rollers according to the direction of travel of the vehicle, the rollers of the other two pairs being rotatable in two respective fixed planes which are perpendicular to each other, the rollers of one of the three pairs of the correcting apparatus being driven by said motor at a speed which may be regulated so as to correspond to the speed of the wind, said rollers also pivoting about an axis passing through the centre of the said spherical element and the plane of the said rollers, and means for orienting the said rollers according to the direction of the wind, the rollers of the other two pairs being rotatable in two respective fixed planes which are perpendicular to each other, the actuated rollers of the main apparatus and the corresponding rollers of the correcting apparatus being disposed in two groups whereof each is adapted to effect one of the movements of the said map, a differential intercalated in the control for each group, said differential serving to unite the said parallel components in two components which latter correspond to the actual speed of travel of the vehicle.

4. In an automatic route indicator for aircraft, the combination of a map which is movable according to the resultant of four components, corresponding to two independent speeds, a main apparatus for the decomposition of the proper speed of the aircraft into two components, a correcting apparatus for the decomposition of the displacement of the aircraft due to the wind into two components which are parallel to the two components of the proper speed of the vehicle, a motor adapted to control the said correcting apparatus, the main apparatus as well as the correcting apparatus comprising in combination a spherical element, three pairs of rollers, the rollers of each pair having their axes parallel and being adapted to bear upon the said spherical element at diametrically opposite points; the rollers of one of the three pairs of the main apparatus being adapted to be suitably controlled and rotating at a speed proportional to the proper speed of the aircraft, said rollers also pivoting on an axis passing through the centre of the said spherical element and the plane of the said rollers, and means for pivoting the said rollers according to the direction of travel of the vehicle, the rollers of the other two pairs being rotatable in two respective fixed planes which are perpendicular to each other, the rollers of one of the three pairs of the correcting apparatus being driven by said motor at a speed which may be regulated so as to correspond to the speed of the wind, said rollers also pivoting about an axis passing through the centre of the said spherical element and the plane of the said rollers, and means for orienting the said rollers according to the direction of the wind, the rollers of the other two pairs being rotatable in two respective fixed planes which are perpendicular to each other, an air screw disposed in the air current due to the forward travel and adapted to drive the pivoting rollers of the main apparatus, a counterweight disposed on the axis of said air screw and maintaining said axis constantly in the horizontal position, in such manner that only the horizontal component of the proper speed of the vehicle shall be utilized to indicate the path of travel, means for controlling the displacements of the map in one direction, these means comprising a differential connected, on the one hand, with one of the two last mentioned rollers of the main apparatus and, on the other hand, with one of the two last mentioned rollers of the correcting apparatus, and means for controlling the displacements of the map according to a direction which is at right angle with the preceding one, these latter means comprising also a differential connected, on the one hand, with the second of the two last mentioned rollers of the main apparatus and, on the other hand, with the second of the two last mentioned rollers of the correcting apparatus, for the purpose specified.

In testimony whereof I have hereto affixed my signature.

GEORGES MENGDEN.